United States Patent
Gorouya et al.

(10) Patent No.: US 9,383,461 B2
(45) Date of Patent: Jul. 5, 2016

(54) SCINTILLATOR PANEL AND RADIATION DETECTOR INCLUDING THE SAME

(71) Applicant: Konica Minolta Inc., Tokyo (JP)

(72) Inventors: Yoshihiro Gorouya, Tachikawa (JP); Takafumi Yanagita, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/800,998

(22) Filed: Jul. 16, 2015

(65) Prior Publication Data
US 2016/0041278 A1  Feb. 11, 2016

(30) Foreign Application Priority Data
Aug. 7, 2014 (JP) .................... 2014-161362

(51) Int. Cl.
*G01T 1/20* (2006.01)
*G01T 7/00* (2006.01)
*G01T 1/202* (2006.01)

(52) U.S. Cl.
CPC . *G01T 7/00* (2013.01); *G01T 1/202* (2013.01); *G01T 1/2018* (2013.01)

(58) Field of Classification Search
CPC ............... G01T 1/20; G21K 4/00; B32B 3/00
See application file for complete search history.

(56) References Cited

U.S. PATENT DOCUMENTS

| 2012/0009375 A1* | 1/2012 | Sakai | G01T 1/20 428/68 |
| 2013/0112882 A1* | 5/2013 | Osawa | G01T 1/202 250/361 R |

FOREIGN PATENT DOCUMENTS

| JP | 2006038870 A | 2/2006 |
| JP | 2011033563 A | 2/2011 |

\* cited by examiner

*Primary Examiner* — David Porta
*Assistant Examiner* — Faye Boosalis
(74) *Attorney, Agent, or Firm* — Lucas & Mercanti, LLP

(57) ABSTRACT

A scintillator panel includes a resin substrate, a phosphor layer which is formed on the resin substrate and converts radiation into visible light, a first moisture-proof protective body that is bonded to a surface of the resin substrate opposite to a surface of the resin substrate, on which the phosphor layer is formed, through an adhesive layer, and a second moisture-proof protective body that is formed so as to integrally cover from a surface of the phosphor layer to a part of a surface of the first moisture-proof protective body opposite to an adhesive surface of the first moisture-proof protective body.

7 Claims, 5 Drawing Sheets

SCINTILLATOR PANEL AND RADIATION DETECTOR INCLUDING THE SAME

The entire disclosure of Japanese Patent Application No. 2014-161362 filed on Aug. 7, 2014 including description, claims, drawings, and abstract are incorporated herein by reference in its entirety.

BACKGROUND OF THE INVENTION

1. Field of the Invention

The present invention relates to a radiation detector used for medical diagnosis, nondestructive inspection, and the like, and a scintillator panel used for the radiation detector.

2. Description of the Related Art

Conventionally, a radiation image such as an X-ray image is widely used for diagnosis of disease in medical fields. In recent years, digital system radiation detectors appear, which are represented by a flat panel type radiation detector (Flat Panel Detector: FPD) that can directly obtain a digital radiation image.

Such a digital system can obtain a digital radiation image and can display the image on an image display device such as a cathode ray tube and a liquid crystal panel, so that it is not necessarily required to form the image on a photographic film. As a result, these digital system radiation detectors reduces the necessity of image forming by silver halide photography and significantly improve convenience of diagnostic work in hospitals and clinics.

Some flat panel type radiation detectors (FPDs) employ a scintillator system which converts radiation into light by a scintillator such as $Gd_2O_2S$ and CsI and thereafter converts the light into electric charges by a photodiode. Such a scintillator system FPD is formed by combining a scintillator panel in which a phosphor layer is formed on a substrate and a photoelectric conversion element member including a thin film transistor and a charge-coupled device.

In the scintillator panel used in such an FPD, when the phosphor layer formed on the substrate has moisture absorbency, a moisture-proof protective body is provided to cover the substrate and the phosphor layer so that moisture is prevented from reaching the phosphor layer and deteriorating the phosphor layer.

For example, as shown in FIG. 5, JP 2006-38870 A discloses a scintillator panel 100 in which a phosphor layer 104 is formed on a resin substrate 102, and thereafter a first moisture-proof protective body 106 is provided so as to cover from a surface of the phosphor layer 104 to a part of a surface of the resin substrate 102 opposite to a surface on which the phosphor layer 104 is formed, and further a second moisture-proof protective body 110 is formed on a portion of the resin substrate 102 other than a portion of the resin substrate 102 on which the first moisture-proof protective body 106 is provided and on the first moisture-proof protective body 106 on the resin substrate 102 through an adhesive layer 108.

As shown in FIG. 6, JP 2011-33563 A discloses a scintillator panel 200 in which a phosphor layer 204 is formed on a metallic hard substrate 202, and thereafter a moisture-proof protective body 206 is provided so as to cover from a surface of the phosphor layer 204 to a surface of the hard substrate 202 opposite to a surface on which the phosphor layer 204 is formed.

The moisture-proof protective body 206 of the scintillator panel 200 is formed by placing the hard substrate 202 on a rotating table in a supportive manner through a plurality of supporting needles and, in this state, performing vapor deposition while rotating the rotating table in a vapor deposition apparatus using a CVD method.

By forming the scintillator panels 100 and 200 in this manner, it is possible to prevent moisture from reaching the phosphor layers 104 and 204 and to continue a desired function without deteriorating the phosphor layers 104 and 204.

However, in the scintillator panel 100 disclosed in JP 2006-38870 A, as shown in FIG. 7, although moisture is prevented by the first moisture-proof protective body 106 and the second moisture-proof protective body 110, moisture may reach the phosphor layer 104 from the adhesive layer 108 between the resin substrate 102 and the second moisture-proof protective body 110 through the resin substrate 102 as indicated by arrows, so that it is not possible to perfectly prevent moisture from reaching the phosphor layer 104.

Further, in the scintillator panel 200 disclosed in JP 2011-33563 A, although it is possible to perfectly prevent moisture from reaching the phosphor layer 204 because the moisture-proof protective body 206 covers the hard substrate 202 and the phosphor layer 204, as shown in FIG. 8, when forming a radiation detector 220 by bonding together the scintillator panel 200 and a photoelectric conversion element member 210, there is a case in which air 230 remains between the scintillator panel 200 and the photoelectric conversion element member 210 and air gaps occur between them when bonding together the scintillator panel 200 and the photoelectric conversion element member 210 because the hard substrate 202 is used in the scintillator panel 200.

In the scintillator panel 200 of JP 2011-33563 A, if the hard substrate 202 is replaced by a soft resin substrate, when bonding together the soft resin substrate and the photoelectric conversion element member 210, it is possible to bond the photoelectric conversion element member 210 to the scintillator panel 200 by following small unevenness on the scintillator panel 200. Therefore, it is considered that it is possible to prevent the air 230 from remaining between the photoelectric conversion element member 210 and the scintillator panel 200.

However, in this case, a soft resin substrate is used, so that when forming the moisture-proof protective body 206 in a vapor deposition apparatus using a CVD method, it is difficult to maintain the resin substrate horizontally straightforward, and the moisture-proof protective body 206 is formed in a state in which the resin substrate is deflected.

When bonding together the scintillator panel 200 obtained in this manner and the photoelectric conversion element member 210, the scintillator panel 200 is restored from the deflected state to the straightforward state by the photoelectric conversion element member 210. Therefore, in some cases, the moisture-proof protective body 206 is broken and the moisture-proof property of the phosphor layer 204 degrades.

SUMMARY OF THE INVENTION

The present invention has been made in view of the above situation, and an object thereof is to provide a scintillator panel that reliably prevents moisture from reaching the phosphor layer, does not generate air gaps when it is bonded to the photoelectric conversion element member, and does not cause the moisture-proof protective body to be broken, and a radiation detector including the scintillator panel.

The aforementioned object of the present invention is achieved by the following configurations:

(1) To achieve the abovementioned object, according to an aspect, a scintillator panel reflecting one aspect of the present invention comprises a resin substrate, a phosphor layer which is formed on the resin substrate and converts radiation into visible light, a first moisture-proof protective body that is bonded to a surface of the resin substrate opposite to a surface of the resin substrate, on which the phosphor layer is formed, through an adhesive layer, and a second moisture-proof protective body that is formed so as to integrally cover from a surface of the phosphor layer to a part of a surface of the first moisture-proof protective body opposite to an adhesive surface of the first moisture-proof protective body.

(2) In the scintillator panel of Item. 1, the second moisture-proof protective body is preferably a poly-para-xylylene film formed by a CVD method.

(3) In the scintillator panel of Item. 1 or 2, the first moisture-proof protective body preferably has flexibility.

(4) In the scintillator panel of any one of Items. 1 to 3, the first moisture-proof protective body is preferably formed from a resin film composed mainly of a resin.

(5) In the scintillator panel of Item. 4, an inorganic layer is preferably further formed on the resin film.

(6) In the scintillator panel of any one of Items. 1 to 5, the resin substrate preferably has flexibility.

(7) A radiation detector preferably comprises the scintillator panel of anyone of Items. 1 to 6 and a photoelectric conversion element member which is bonded to the phosphor layer of the scintillator panel and in which photoelectric conversion elements are arranged two-dimensionally.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described in detail with reference to the drawings. However, the scope of the invention is not limited to the illustrated examples.

A radiation detector of the present invention and a scintillator panel used for the radiation detector are used for medical diagnosis, nondestructive inspection, and the like.

<<Radiation Detector 60>>

Figure 1:
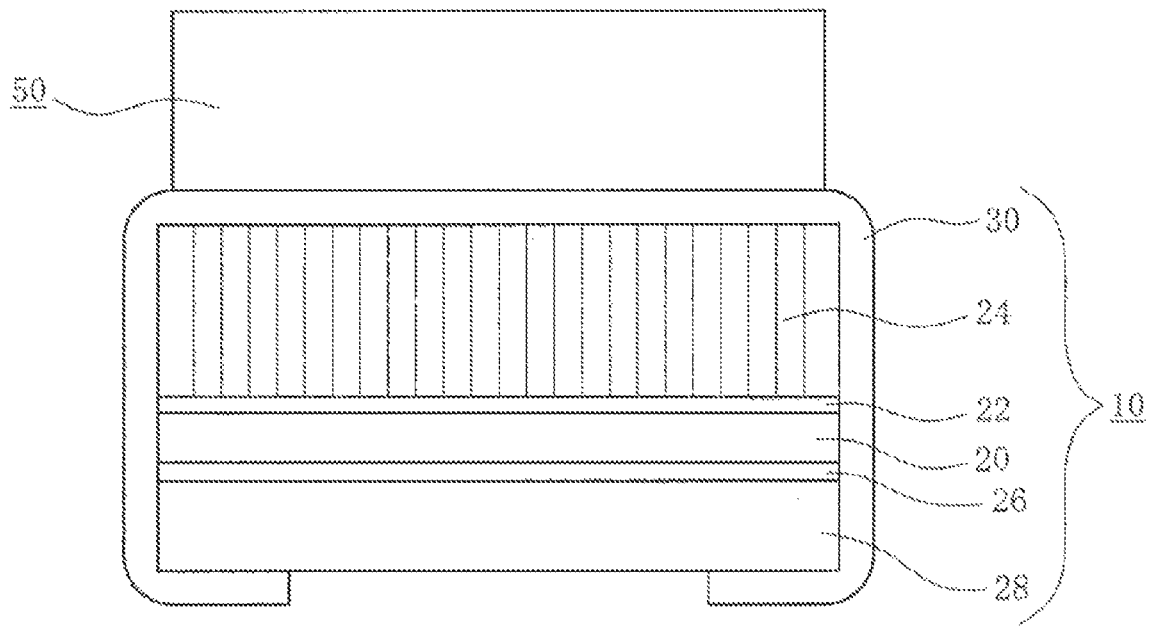
FIG. 1 is a schematic cross-sectional view of a radiation detector including a scintillator panel according to an embodiment of the present invention.

As shown in FIG. 1, a radiation detector 60 of the present invention includes, in rough classification, a scintillator panel 10 and a photoelectric conversion element member 50 which is bonded to a phosphor layer 24 of the scintillator panel 10 and in which photoelectric conversion elements are arranged two-dimensionally. The radiation detector 60 converts radiation into light by the phosphor layer 24 of the scintillator panel 10 and thereafter converts the light into electric charges by the photoelectric conversion element member 50 and obtains a digital radiation image.

In the present invention, in particular, the scintillator panel 10 has a characteristic configuration where a moisture-proof effect is enhanced. Hereinafter, the scintillator panel 10 will be described in detail.

<<Scintillator Panel 10>>

Figure 2:
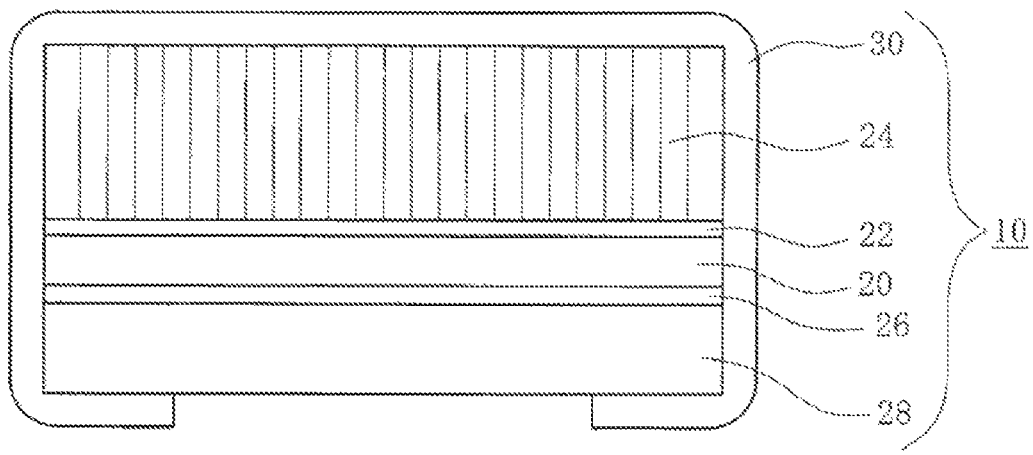
FIG. 2 is a schematic cross-sectional view of the scintillator panel according to the embodiment of the present invention.

As shown in FIG. 2, the scintillator panel 10 of the present invention includes a resin substrate 20, a reflective layer 22 formed on the resin substrate 20, and a phosphor layer 24 that converts radiation into visible light on the reflective layer 22.

A first moisture-proof protective body 28 is bonded to a surface of the resin substrate 20 opposite to a surface of the resin substrate 20, over which the phosphor layer 24 is formed, through an adhesive layer 26, and further a second moisture-proof protective body 30 is provided so as to integrally cover from a surface of the phosphor layer 24 to a part of a surface of the first moisture-proof protective body 28 opposite to an adhesive surface of the first moisture-proof protective body 28. In this manner, the scintillator panel 10 is configured.

Although the reflective layer 22 formed on the resin substrate 20 is not an essential component, it is more preferable to include the reflective layer 22 to efficiently transmit light converted from radiation to the photoelectric conversion element member 50 when the scintillator panel 10 is bonded to the photoelectric conversion element member 50 to form the radiation detector 60.

Specific materials and the like of the components described above are as follows:

<Resin Substrate 20>

The resin substrate 20 is not particularly limited if the resin substrate 20 has radiation transparency and can support the phosphor layer 24.

The resin substrate 20 is preferable to be a flexible polymer film having a thickness of 10 to 1000 μm and more preferably 30 to 500 μm. Here, the "flexible" is a property in which when one of the four sides of the resin substrate 20 is fixed, at a point 10 cm away from the fixed side, the resin substrate 20 sags 2 mm or more with respect to the position of the fixed side by the gravity of the weight of the resin substrate 20.

As such a flexible resin substrate 20, in particular, a polymer film containing polyimide or polyethylene naphthalate is preferred to form a column crystal phosphor layer 24 by a vapor phase deposition method by using cesium iodide as a raw material.

Specific examples of the resin substrate 20 include polymer films formed of polyethylene naphthalate, polyethylene terephthalate, polybutylene naphthalate, polycarbonate, syndiotactic polystyrene, polyimide, polyetherimide, polyarylate, polysulfone, polyether sulfone, and the like.

Each of these materials may be individually used, or these materials may be used by laminating or mixing some of them. Above all, as described above, a polymer film containing polyimide or polyethylene naphthalate is particularly preferred.

<Reflective Layer 22>

Next, as the reflective layer 22, a pigment layer in which metallic thin film and white pigment are dispersed and contained in a resin is preferable, and thereby it is possible to improve the sensitivity of the radiation detector 60. Here, the metallic thin film can be formed on the resin substrate 20 by vapor deposition or sputtering method by using metals such as Ag, Al, Ni, and Cr. As the pigment layer, for example, a layer in which white pigment is dispersed and contained in a resin is used. The pigment layer is preferable from a viewpoint of no corrosion and the durability.

As a manufacturing method of the reflective layer 22, for example, the following manufacturing methods are used:

(1) Resin and white pigment are dispersed in an organic solvent and the organic solvent is applied onto the resin substrate 20 and dried to form the reflective layer 22.

(2) White pigment is dispersed in a molten resin and the molten resin and a resin for the resin substrate 20 are rolled or stretched into a film shape by co-extrusion, so that the pigment is dispersed on the resin substrate 20 and the reflective layer 22 is formed.

The details of the manufacturing methods in which pigment is dispersed on the resin substrate 20 to form the reflective layer 22 are as described in JP 6-226894 A.

Examples of the white pigment include titanium oxide, zinc oxide, aluminum oxide, calcium carbonate, and barium sulfate. Above all, titanium oxide and calcium carbonate are preferred.

Examples of the resin in which the pigment is dispersed include polyurethane, polyester (for example, polyethylene terephthalate and polyethylene naphthalate), vinyl chloride copolymer (for example, vinyl chloride-vinyl acetate copolymer, vinyl chloride-vinylidene chloride copolymer, and vinyl chloride-acrylonitrile copolymer), butadiene-acrylonitrile copolymer, polyamide resin, polyvinyl butyral, cellulose derivative (cellulose nitrate, and the like), styrene-butadiene copolymer, various synthetic rubber-based resins, phenol resin, epoxy resin, melamine resin, phenoxy resin, silicon resin, fluororesin, acrylic based resin, and urea formamide resin. Above all, polyurethane, polyester, vinyl chloride copolymer, polyvinyl butyral, and cellulose nitrate are preferred.

Among them, polyurethane thermoplastic elastomer and polyester thermoplastic elastomer are preferred in the manufacturing method (1) described above.

In the manufacturing method (2) described above, the resin is desired to be the same resin as that of the resin substrate 20 because the manufacturing method is co-extrusion, and among them, polyethylene terephthalate is preferred. A pigment dispersion layer (not shown in the drawings) may be provided on both surfaces of the resin substrate 20 in order to prevent warp and prevent peeling off.

A foamable resin (for example, polyethylene terephthalate) containing a large number of bubbles used as the reflective layer 22 may be also used the resin substrate 20, and a structure that functions as the resin substrate 20 and the reflective layer 22 at the same time may be employed.

In addition, to strengthen bonding between the resin substrate 20 and the reflective layer 22 or the phosphor layer 24, an undercoat layer (not shown in the drawings) that imparts adhesive properties may be provided by applying high molecular material such as polyester or gelatin onto the surface of the resin substrate 20, and a light absorbing layer (not shown in the drawings) formed of light absorbing material such as carbon black may be provided.

These configurations can be arbitrarily selected according to purpose, usage, and the like.

It is preferable to change the reflectance of the reflective layer 22 because the sensitivity can be adjusted to a desired property. As adjustment of the reflectance, a method that uses colored pigment is proposed. However, it is not a preferable method because discoloration of pigment easily occurs with time.

Regarding stable control of the reflectance, a method that adjusts the reflectance by a mixing ratio between white pigment and carbon black or the like and a method that adjusts the film thicknesses of the resin substrate 20 with low reflectance and the reflective layer 22 with white pigment are preferred.

Regarding the adjustment of the reflectance by the thickness of the reflective layer 22, it is possible to uniformly adjust the reflectance by adjusting the thickness of the resin substrate 20 such as a polyimide substrate which absorbs light and the thickness of the pigment layer.

Spectral reflectance of the reflective layer 22 can be measured by using a commercially available spectral reflectance measuring device (for example, Hitachi recording spectrophotometer U-3210, Hitachi recording spectrophotometer U-4000, and the like).

<Phosphor Layer 24>

Although the phosphor layer 24 can be formed by various known phosphor materials, it is preferable to form the phosphor layer 24 by cesium iodide (CsI) because when the cesium iodide is used, a conversion ratio from X-ray to visual light is relatively high, phosphor can be easily formed into a column crystal structure by vapor deposition, scattering of emitted light in a crystal is suppressed by a light guide effect, and the thickness of the phosphor layer 24 can be increased.

However, when only CsI is used, the light emitting efficiency is low, so that it is preferable to add various activating agents. For example, as disclosed in JP 54-35060 B, a material obtained by mixing CsI and sodium iodide (NaI) at an arbitrary molar ratio is used.

For example, as disclosed in JP 2001-59899 A, the phosphor layer 24 can also be formed by depositing CsI containing activating material such as indium (In), thallium (Tl), lithium (Li), potassium (K), rubidium (Rb), and sodium (Na).

Further, as a base material to form the phosphor layer 24 of CsI containing thallium, cesium iodide and one or more kinds of thallium compounds functioning as activating agents are preferably used. Thallium activated cesium iodide (CsI: Tl) is preferred because the thallium activated cesium iodide has a wide emission wavelength range from 400 nm to 750 nm and is well matched to the photoelectric conversion element member 50.

As the one or more kinds of thallium compounds functioning as activating agents, various thallium compounds (compounds of oxidation number of +I and +III) can be used. A preferred thallium compound is thallium iodide (TlI), thallium bromide (TlBr), thallium chloride (TlCl), thallium fluoride (TlF, $TlF_3$), or the like.

The melting point of the thallium compound under ordinary temperature and normal pressure is preferred to be in a range from 400° C. to 700° C. from a standpoint of light emitting efficiency. The molecular weight of the thallium compound is preferred to be in a range from 206 to 300.

In the phosphor layer 24, the content of the activation agent is desired to be an optimal amount according to purpose, performance, and the like, and the content is preferred to be 0.001 mol % to 50 mol %, and is more preferred to be 0.1 mol % to 10.0 mol % with respect to the content of the cesium iodide.

As a base material to form the phosphor layer 24, various materials can be used in addition to the aforementioned CsI:

Tl. As an example, the base material is preferred to contain alkali metal halide phosphor represented by the following general expression (1).

$$M^1X \cdot aM^2X'_2 \cdot bM^3X''_3 : eA \quad (1)$$

In the above expression, $M^1$ is at least one kind of alkali metal atom selected from atoms of Li, Na, K, Rb, and Cs, $M^2$ is at least one kind of divalent metal atom selected from atoms of Be, Mg, Ca, Sr, Ba, Zn, Cd, Cu, and Ni, $M^3$ is at least one kind of trivalent metal atom selected from atoms of Sc, Y, La, Ce, Pr, Nd, Pm, Sm, Eu, Gd, Tb, Dy, Ho, Er, Tm, Yb, Lu, Al, Ga, and In, X, X', and X'' are at least one kind of halogen atom selected from atoms of F, Cl, Br, and I, A is at least one kind of metal atom selected from atoms of Eu, Tb, In, Ce, Tm, Dy, Pr, Ho, Nd, Yb, Er, Gd, Lu, Sm, Y, Tl, Na, Ag, Cu, and Mg, and a, b, and e represent numerical values of $0 \le a < 0.5$, $0 \le b < 0.5$, and $0 < e \le 0.2$, respectively.

It is preferable that $M^1$ contains at least Cs. It is preferable that X contains at least I. It is preferable that A is, in particular, Tl or Na. It is preferable that e is a numerical value in a range of $1 \times 10^{-4} \le e \le 0.1$.

Rare-earth-activated alkaline earth metal fluoride halide phosphor represented by the following general expression (2) is also preferred as a raw material to form the phosphor layer 24.

$$M^4FX : zLn \quad (2)$$

In the above expression, $M^4$ is at least one kind of alkaline earth metal selected from atoms of Ba, Sr, and Ca, and Ln represents at least one kind of rare-earth element selected from atoms of Ce, Pr, Sm, Eu, Tb, Dy, Ho, Nd, Er, Tm, and Yb. X represents at least one kind of halogen selected from atoms of Cl, Br, and I. Further, z represents a numerical value in a range of $0 < z \le 0.2$.

It is preferable that Ba occupies a half or more of $M^4$. It is preferable that Ln is, in particular, Eu or Ce.

Further, examples of the raw material to form the phosphor layer 24 also include LnTaO$_4$: (Nb, Gd) system, Ln SiO$_5$: Ce system, LnOX: Tm system (Ln is a rare earth element), Gd$_2$O$_2$S: Tb, Gd$_2$O$_2$S: Pr, Ce, ZnWO$_4$, LuAlO$_2$: Ce, Gd$_2$Ga$_5$O$_{12}$: Cr, Ce, HfO$_2$, and the like.

As a vapor phase deposition method, for example, it is possible to use various methods such as a vapor deposition method, a sputtering method, a CVD (Chemical Vapor Deposition) method, and an ion plating method, however, in particular, the vapor deposition method is preferred.

Although an average film thickness of the phosphor layer 24 varies depending on the intended use of the scintillator panel 10 or the type of phosphor material, the average film thickness is preferred to be 100 to 700 μm.

<First Moisture-Proof Protective Body 28>

The first moisture-proof protective body 28 is obtained by bonding a moisture-proof protective body that has been separately formed in advance to the resin substrate 20 through the adhesive layer 26.

The first moisture-proof protective body 28 prevents moisture from reaching the phosphor layer 24 and suppresses degradation of the phosphor layer 24. The first moisture-proof protective body 28 is formed from a film with low moisture permeability.

The first moisture-proof protective body 28 is preferred to have flexibility. The "flexibility" is a property in which when one of the four sides of the first moisture-proof protective body 28 is fixed, at a point 10 cm away from the fixed side, the first moisture-proof protective body 28 sags 2 mm or more with respect to the position of the fixed side by the gravity of the weight of the first moisture-proof protective body 28.

Examples of the first moisture-proof protective body 28 having flexibility include resin films composed mainly of a resin, such as polyethylene terephthalate film (PET), polyester film, polymethacrylate film, cellulose nitrate film, cellulose acetate film, polypropylene film, and polyethylene naphthalate film.

It is possible to laminate a plurality of deposited films obtained by depositing metallic oxide or the like on these resin films as an inorganic layer according to a required moisture-proof property. In this case, the inorganic layer on the resin film is located on a surface bonded to the adhesive layer 26.

The thickness of the first moisture-proof protective body 28 is preferred to be in a range of 0.03 to 1.0 mm.

The moisture permeability (also referred to as water vapor permeability) of the first moisture-proof protective body 28 is preferred to be smaller than or equal to 50 g/m$^2$·day, is more preferred to be smaller than or equal to 10 g/m$^2$·day, and is particularly preferred to be smaller than or equal to 1 g/m$^2$ day.

Here, the moisture permeability of the first moisture-proof protective body 28 can be measured by referring to a method specified by JIS Z 0208.

Specifically, the moisture permeability in the present invention can be measured by the following method:

At 40° C., one side of the first moisture-proof protective body 28 is maintained at 90% RH (relative humidity) and the other side is maintained in a dry state by moisture absorbent.

After 24 hours in this state, the mass (g) of the water vapor that has passed through the first moisture-proof protective body 28 (assuming that the area of the first moisture-proof protective body 28 is 1 m$^2$) is defined as the moisture permeability of the first moisture-proof protective body 28 of the present invention.

From a viewpoint of adjusting the moisture permeability of the first moisture-proof protective body 28 in the range described above and improving the moisture-proof property, it is preferable to select a polyethylene terephthalate film or a polyethylene terephthalate film obtained by depositing an alumina as an inorganic layer.

<Second Moisture-Proof Protective Body 30>

The second moisture-proof protective body 30 may be formed by laminating inorganic materials such as SiC, SiO$_2$, SiN, and Al$_2$O$_3$ by, for example, the vapor deposition method and the sputtering method, or by forming a poly-para-xylylene film by the CVD method. In the present invention, it is preferable to form a poly-para-xylylene film by the CVD method.

As the poly-para-xylylene film, in addition to poly-para-xylylene, poly-monochloro-para-xylylene, poly-dichloro-para-xylylene, poly-tetrachloro-para-xylylene, poly-fluoro-para-xylylene, poly-dimethyl-para-xylylene, poly-diethyl-para-xylylene, and the like are included.

The thickness of the second moisture-proof protective body 30 is preferred to be 3 to 50 μm, and is more preferred to be 5 to 20 μm considering a protective moisture resistance property, sharpness, a moisture-proof property, workability, and the like of the phosphor layer 24.

The haze rate of the second moisture-proof protective body 30 is preferred to be 3% to 40%, and is more preferred to be 3% to 10% considering sharpness, radiation image irregularity, manufacturing stability, workability, and the like. The haze rate indicates a value measured by Nippon Denshoku Industries Co., Ltd NDH 5000W.

The light transmittance of the second moisture-proof protective body 30 is preferred to be 70% or more at 550 nm considering photoelectric conversion efficiency, phosphor emission wavelength, and the like.

The moisture permeability of the second moisture-proof protective body 30 is preferred to be smaller than or equal to 50 g/m$^2$·day (40° C./90% RH) (measured based on JIS Z0208, the same applies hereafter), and is more preferred to be smaller than or equal to 10 g/m$^2$·day (40° C./90% RH) considering protection, deliquescency, and the like of the phosphor layer 24.

In the scintillator panel 10 as described above, the first moisture-proof protective body 28 is first bonded to the resin substrate 20 through the adhesive layer 26, and further the second moisture-proof protective body 30 is provided so as to integrally cover from the surface of the phosphor layer 24 to a part of the surface of the first moisture-proof protective body 28 opposite to the adhesive surface of the first moisture-proof protective body 28, so that there is no moisture penetration path to the phosphor layer 24 and it is possible to reliably prevent moisture from penetrating to the phosphor layer 24.

Further, the substrate on which the phosphor layer 24 is formed is the resin substrate 20, so that it is possible to bond the photoelectric conversion element member 50 to the scintillator panel 10 by following small unevenness on the scintillator panel 10 when bonding together the scintillator panel 10 and the photoelectric conversion element member 50. Therefore, it is possible to prevent the air gaps that are conventionally generated between the scintillator panel 10 and the photoelectric conversion element member 50 and to improve image sharpness.

Hereinafter, a manufacturing method of the scintillator panel 10 of the present invention will be described.

<<Manufacturing Method of Scintillator Panel>>

Figure 3A:
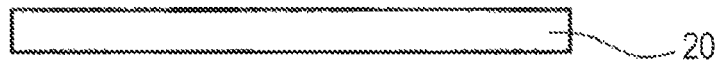
FIGS. 3A to 3D are process drawings for explaining a manufacturing process of the scintillator panel according to the embodiment of the present invention.

As shown in FIG. 3A, first, the resin substrate 20 is prepared.

Figure 3B:
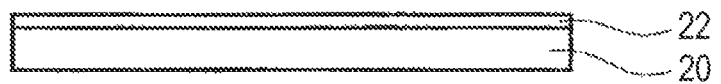
Figure 3C:
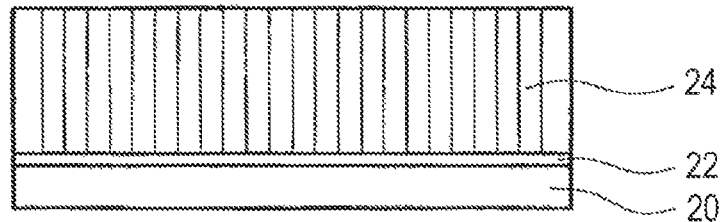

Subsequently, as shown in FIG. 3B, the reflective layer 22 is formed on the resin substrate 20 and, as shown in FIG. 3C, the phosphor layer 24 is formed on the reflective layer 22.

Figure 3D:
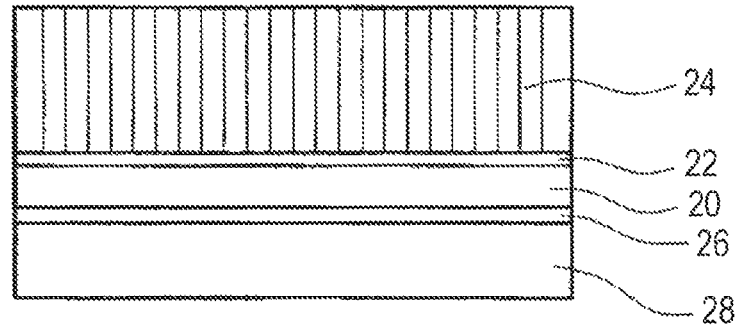

Subsequently, as shown in FIG. 3D, the first moisture-proof protective body 28 is bonded to a surface of the resin substrate 20 opposite to a surface of the resin substrate 20, on which the phosphor layer is formed, through the adhesive layer 26.

Figure 4A:
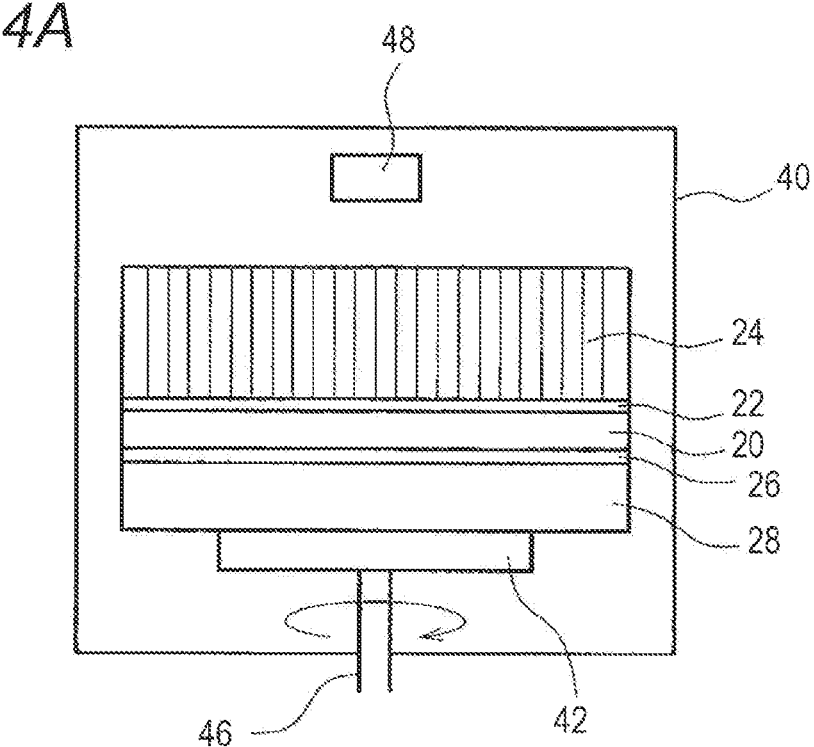
FIGS. 4A and 4B are process drawings for explaining a manufacturing process of the scintillator panel according to the embodiment of the present invention.
Figure 4B:
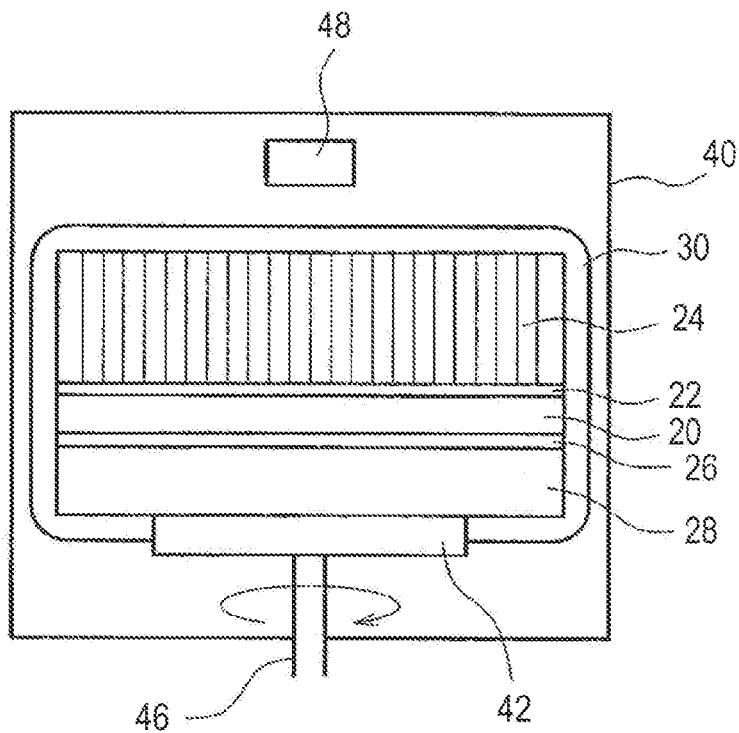
Figure 5:
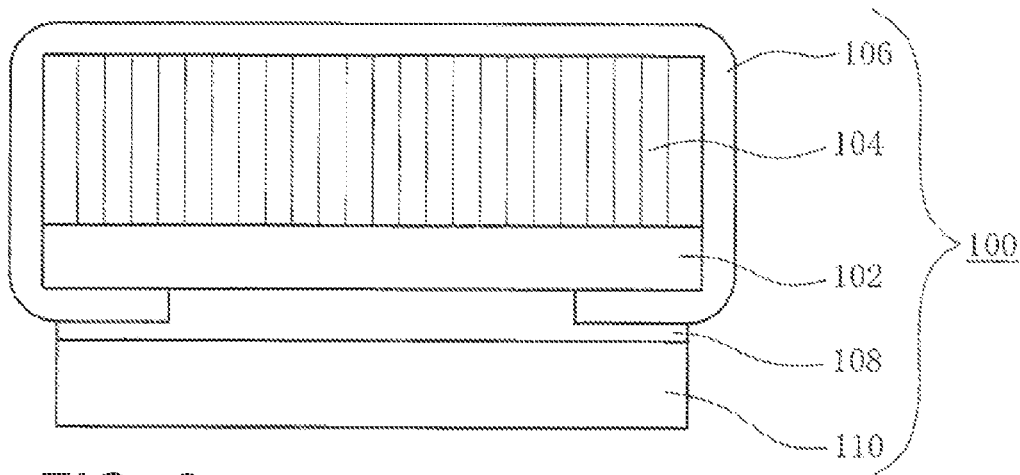
FIG. 5 is a schematic cross-sectional view of a conventional scintillator panel.
Figure 6:
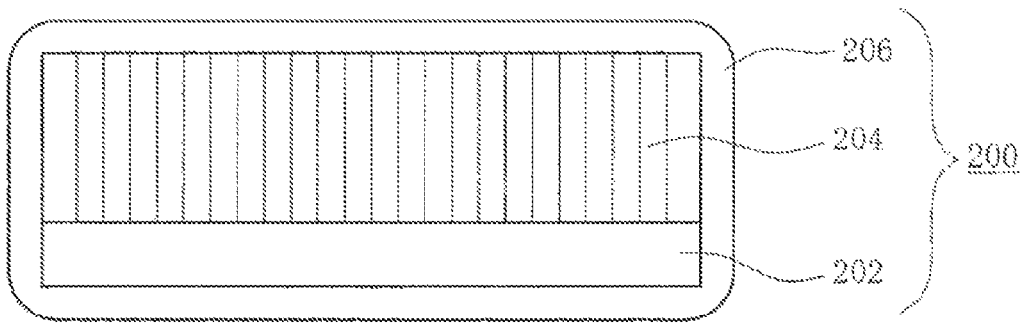
FIG. 6 is a schematic cross-sectional view of a conventional scintillator panel.
Figure 7:
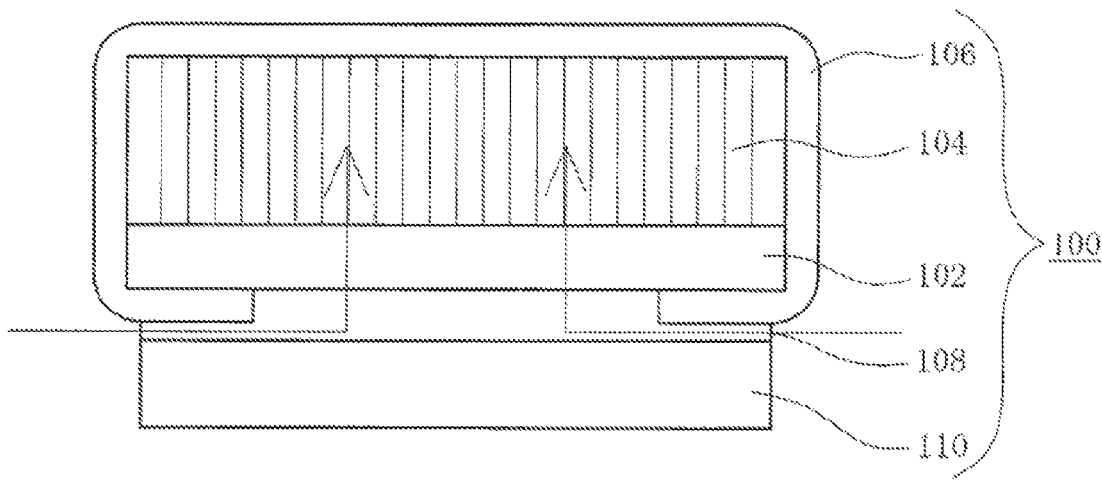
FIG. 7 is a schematic cross-sectional view of a conventional scintillator panel.
Figure 8:
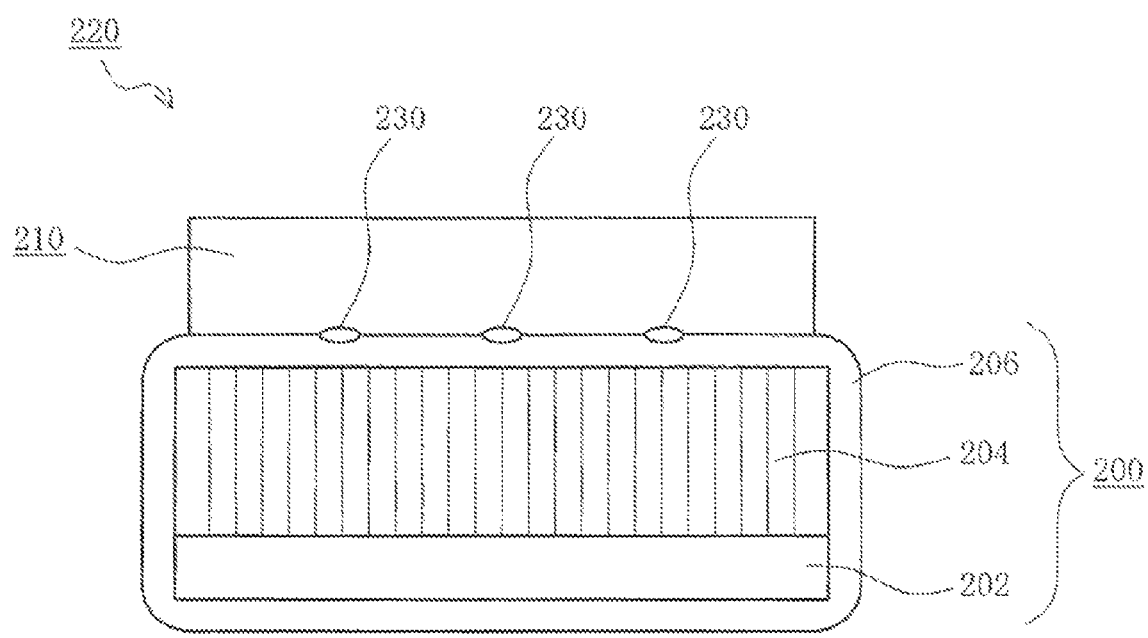
FIG. 8 is a schematic cross-sectional view of a radiation detector including the conventional scintillator panel shown in FIG. 6.

Then, as shown in FIG. 4A, the laminated body is mounted on a rotating table 42 of a vapor deposition apparatus 40 and a vapor deposition source 48 is evaporated while the rotating table 42 is being rotated through a rotating shaft 46. Thereby, as shown in FIG. 4B, the second moisture-proof protective body 30 is deposited and formed so as to integrally cover from the surface of the phosphor layer 24 to a part of a surface of the first moisture-proof protective body 28 opposite to the adhesive surface of the first moisture-proof protective body 28. The method of depositing and forming the second moisture-proof protective body 30 is a so-called CVD method.

Then, the laminated body is taken out from the vapor deposition apparatus 40, so that the scintillator panel 10 of the present invention as shown in FIG. 2 is obtained.

The rotating table 42 of the vapor deposition apparatus 40 has a flat surface, so that even a soft resin substrate 20 is maintained in a straight state without being warped. Therefore, when the formed second moisture-proof protective body 30 is bonded to the photoelectric conversion element member 50, the second moisture-proof protective body 30 is not broken and can prevent moisture from penetrating to the phosphor layer.

Further, the scintillator panel 10 uses the resin substrate 20, so that it is possible to prevent air gaps from being generated between the scintillator panel 10 and the photoelectric conversion element member 50 when bonding together the scintillator panel 10 and the photoelectric conversion element member 50.

While the preferred embodiment of the scintillator panel 10 of the present invention and the radiation detector 60 including the scintillator panel 10 has been described, the present invention is not limited to the embodiment described above and can be variously modified without departing from the purpose of the present invention.

According to an embodiment of the present invention, it is possible to provide a scintillator panel that reliably prevents the phosphor layer from being degraded by moisture and further does not generate air gaps when it is bonded to the photoelectric conversion element member, and a radiation detector including the scintillator panel.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A scintillator panel comprising:
   a resin substrate;
   a phosphor layer which is formed on the resin substrate and converts radiation into visible light;
   a first moisture-proof protective body that is bonded to a surface of the resin substrate opposite to a surface of the resin substrate, on which the phosphor layer is formed, through an adhesive layer; and
   a second moisture-proof protective body that is formed so as to integrally cover from a surface of the phosphor layer to a part of a surface of the first moisture-proof protective body opposite to an adhesive surface of the first moisture-proof protective body.

2. The scintillator panel according to claim 1, wherein the second moisture-proof protective body is a poly-para-xylylene film formed by a CVD method.

3. The scintillator panel according to claim 1, wherein the first moisture-proof protective body has flexibility.

4. The scintillator panel according to claim 1, wherein the first moisture-proof protective body is formed from a resin film composed mainly of a resin.

5. The scintillator panel according to claim 4, wherein an inorganic layer is further formed on the resin film.

6. The scintillator panel according to claim 1, wherein the resin substrate has flexibility.

7. A radiation detector comprising:
   the scintillator panel according to claim 1; and
   a photoelectric conversion element member which is bonded to the phosphor layer of the scintillator panel and in which photoelectric conversion elements are arranged two-dimensionally.

* * * * *